US010626992B2

(12) United States Patent
Wiseman et al.

(10) Patent No.: US 10,626,992 B2
(45) Date of Patent: Apr. 21, 2020

(54) SEALANT CONTAINMENT ASSEMBLY, SYSTEM, AND METHOD

(71) Applicant: THE BOEING COMPANY, Chicago, IL (US)

(72) Inventors: Jesse Randal Wiseman, Everett, WA (US); Shane S. Park, Seattle, WA (US); Donald K. Crenshaw, Snohomish, WA (US); Kjersta Larson-Smith, Seattle, WA (US); Geoffrey Eric Towle, Bonney Lake, WA (US); Hugh Christopher VanValkenburgh, Seattle, WA (US); Karen A. Schultz, Seattle, WA (US); Solomon T. Atsebha, Seattle, WA (US)

(73) Assignee: The Boeing Company, Chicago, IL (US)

( * ) Notice: Subject to any disclaimer, the term of this patent is extended or adjusted under 35 U.S.C. 154(b) by 632 days.

(21) Appl. No.: 14/954,270

(22) Filed: Nov. 30, 2015

(65) Prior Publication Data
US 2017/0152949 A1 Jun. 1, 2017

(51) Int. Cl.
*F16B 33/00* (2006.01)
*F16B 39/02* (2006.01)
(Continued)

(52) U.S. Cl.
CPC ............... *F16J 15/002* (2013.01); *B64C 3/00* (2013.01); *B64F 5/10* (2017.01); *F16J 15/14* (2013.01);
(Continued)

(58) Field of Classification Search
CPC ...... F16B 33/004; F16B 37/14; F16B 11/006; F16B 19/008; F16B 39/021; F16J 15/14;
(Continued)

(56) References Cited

U.S. PATENT DOCUMENTS 2,710,113 A * 6/1955 Pritchard ............... B64D 37/06
156/280
3,168,144 A 2/1965 Capowich
(Continued)

FOREIGN PATENT DOCUMENTS

DE 35 45 849 7/1987
EP 0 082 248 6/1983

OTHER PUBLICATIONS

French preliminary search report for FR 1661338, dated Feb. 4, 2019 (and English translation).
(Continued)

*Primary Examiner* — Philip C Tucker
*Assistant Examiner* — Brian R Slawski
(74) *Attorney, Agent, or Firm* — The Small Patent Law Group LLC; Joseph M. Butscher

(57) ABSTRACT

A sealant containment assembly is configured to bound at least a portion of a fastener pattern between at least two components, such as components used to form at least a portion of an aircraft. The sealant containment assembly includes at least one sealant containment member that is configured to sealingly engage peripheral portions of components. The sealant containment member(s) is configured to form a sealing chamber around at least a portion of the fastener pattern. Fluid sealant is configured to flow into the sealing chamber and cure to seal fasteners within the fastener pattern that connect the components together.

20 Claims, 7 Drawing Sheets

(51) Int. Cl.
   *B29C 65/48*   (2006.01)
   *B29C 65/54*   (2006.01)
   *B29C 65/56*   (2006.01)
   *B29C 65/72*   (2006.01)
   *B29C 65/00*   (2006.01)
   *B32B 37/00*   (2006.01)
   *B29C 45/00*   (2006.01)
   *F16J 15/00*   (2006.01)
   *F16J 15/14*   (2006.01)
   *B64F 5/10*    (2017.01)
   *B64C 3/00*    (2006.01)

(52) U.S. Cl.
   CPC ............ *B29C 45/00* (2013.01); *B29C 65/483* (2013.01); *B29C 65/542* (2013.01); *B29C 65/562* (2013.01); *B29C 65/72* (2013.01); *F16B 33/004* (2013.01); *F16B 39/021* (2013.01)

(58) Field of Classification Search
   CPC ....... B29C 65/48; B29C 65/483; B29C 65/54; B29C 65/542; B29C 65/562; B29C 65/60; B29C 65/601; B29C 65/72; B29C 39/00; B29C 39/02; B29C 39/10; B29C 45/00; B64D 45/02
   USPC ......... 156/60, 87, 90, 91, 92, 145, 242, 245, 156/289, 292, 304.1, 304.2, 305; 29/525.02, 525.11; 428/223; 403/34, 35, 403/37, 38, 39; 411/82.1; 244/131; 277/632
   See application file for complete search history.

(56)           References Cited

U.S. PATENT DOCUMENTS

| | | | |
|---|---|---|---|
| 3,907,442 A | | 9/1975 | Reid |
| 4,572,522 A | * | 2/1986 | Smagatz ................ F16J 15/121 |
| | | | 277/632 |
| 2006/0038088 A1 | * | 2/2006 | Dodson .................... B64C 9/22 |
| | | | 244/214 |
| 2013/0284359 A1 | * | 10/2013 | Virnelson ............ B65D 41/005 |
| | | | 156/272.2 |
| 2014/0235083 A1 | | 8/2014 | Day |
| 2014/0261994 A1 | * | 9/2014 | Coffland ................ B29C 39/10 |
| | | | 156/245 |
| 2014/0317891 A1 | * | 10/2014 | Steiner .................... B29C 39/10 |
| | | | 24/304 |
| 2014/0319782 A1 | | 10/2014 | Mohammad |
| 2016/0076577 A1 | * | 3/2016 | Rizzello ................ F16B 11/006 |
| | | | 411/82 |

OTHER PUBLICATIONS

Office Action for Canadian Application No. 2,941,816, dated Jun. 17, 2019.

* cited by examiner

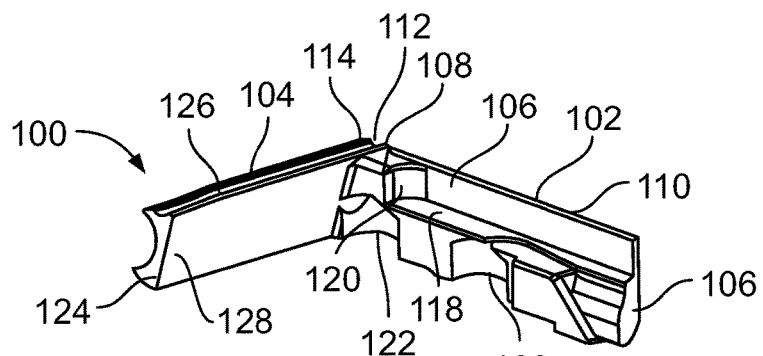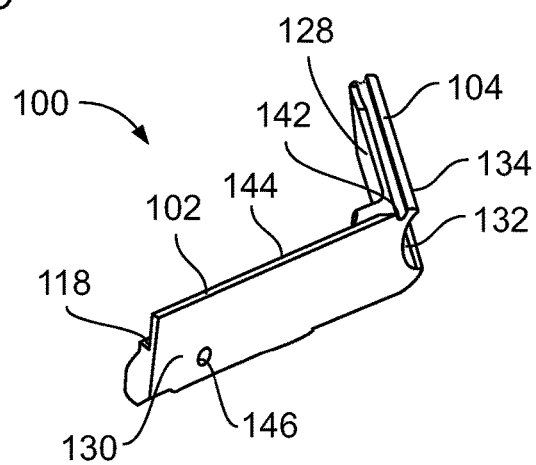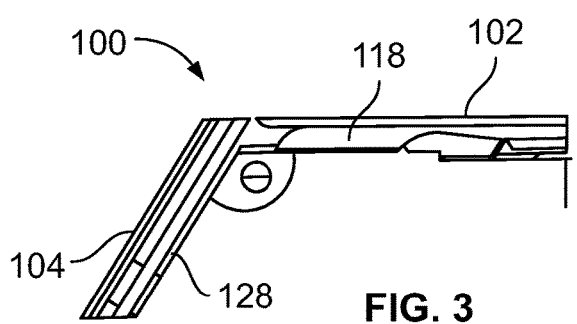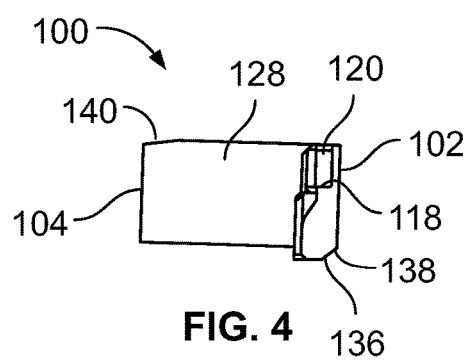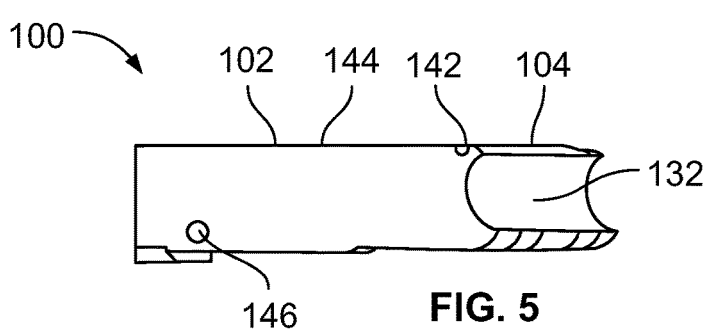

SEALANT CONTAINMENT ASSEMBLY, SYSTEM, AND METHOD

FIELD OF THE DISCLOSURE

Embodiments of the present disclosure generally relate to sealing systems and methods, and, more particularly, systems and methods for sealing a structural joint using a sealant containment assembly.

BACKGROUND OF THE DISCLOSURE

Various components are secured together to form portions of an aircraft. For example, wings are secured to a fuselage. Each wing may include one or more stringers that are secured to a body that forms part of, and/or otherwise connects to, the fuselage. In order to secure components, such as stringers, to other components, such as body portions, numerous fasteners are used.

At certain portions of the aircraft, components may be secured to other components in areas in which fluid is to flow. For example, a stringer that forms a portion of a wing may secure to a body portion within a fuel delivery chamber, tank, or the like. As such, the fasteners that secure the components together are sealed to protect against electrical discharge in proximity to fuel.

The process of sealing the various fasteners is typically labor and time intensive. For example, the process of sealing fasteners that connect a lower panel stringer to a body joint is often arduous and time-consuming. In general, multiple sealing interfaces configured to contain fuel and protect against electrical discharge (for example lighting strikes) occupy a limited amount of space at an area in which the stringer connects to the body joint. Typically, individual seal caps and fillets are manually secured to the fasteners and components. As such, highly-skilled laborers are needed to perform the long, arduous task of individually sealing the connections, and ensuring that the sealing interfaces satisfy various safety standards. For example, each sealing cap is fit-checked, cleaned, filled with wet sealant, and installed over each fastener. After the sealing caps are properly secured to the fasteners, the sealing interface is checked to determine if excess sealant has escaped from the sealing cap. Any excess sealant may be smoothed and/or removed based on one or more safety standards. The entire process of properly sealing connection joints and confirming proper seal integrity is time-consuming and typically evaluated under subjective criteria.

SUMMARY OF THE DISCLOSURE

A need exists for efficient systems and methods of sealing connection joints of components of an aircraft. A need exists for sealing systems and methods that reduce the time of sealing the components together. Further, a need exists for systems and methods that do not require highly-specialized laborers to seal the components together and ensure proper seal integrity.

With those needs in mind, embodiments of the present disclosure provide a sealant containment assembly configured to bound at least a portion of a fastener pattern between at least two components. The sealant containment assembly may include at least one sealant containment member that is configured to sealingly engage peripheral portions of the components. The sealant containment member(s) is configured to form a sealing chamber around at least a portion of the fastener pattern so as to allow fluid sealant to flow into the sealing chamber and cure to seal fasteners within the fastener pattern that connect the components together.

In at least one embodiment, the sealant containment member may include a first sealant containment member that connects to a second sealant containment member. The first sealant containment member may include a first sealant wall connected to a second sealant wall. The second sealant containment member forms a third sealant wall.

The sealant containment member(s) may include features formed therein that are configured to conform to shapes of one or more of the components and/or the fasteners. The sealant containment member may be formed of pre-cured sealant.

The sealant containment member(s) may include at least one injection port through which the fluid sealant is injected into the sealing chamber. The sealant containment member may also include at least one exhaust port through which gas within the sealing chamber passes out of the sealing chamber. The exhaust port(s) may be formed through a portion of an upper edge of the sealant containment member(s).

The sealant containment member(s) may include a longitudinal channel on an exterior surface that is configured to allow liquid to pass therethrough.

Certain embodiments of the present disclosure provide a sealing system that may include a first component, a second component secured to the first component through a plurality of fasteners in a fastener pattern, and a sealant containment assembly configured to bound at least a portion of the fastener pattern between the first and second components. The sealant containment assembly may include at least one sealant containment member that is configured to sealingly engage peripheral portions of the components. The sealant containment member(s) is configured to form a sealing chamber around at least a portion of the fastener pattern so as to allow fluid sealant to flow into the sealing chamber and cure to seal fasteners within the fastener pattern that connect the components together. The sealing system may also include cured sealant at interfaces between the sealant containment assembly and the first and second components. In at least one embodiment, the first component may include a wing component of an aircraft, and the second component may include an interior body of the aircraft.

Certain embodiments of the present disclosure provide a sealing method that may include forming a sealant containment assembly around at least a portion of a fastener pattern between first and second components, providing sealant at interfaces between the sealant containment assembly and the first and second components, allowing the sealant at the interfaces to cure, injecting fluid sealant into a sealing chamber defined by the sealant containment assembly, and allowing the fluid sealant to cure to form a fluid-tight seal around fasteners within the fastener pattern.

BRIEF DESCRIPTION OF THE DRAWINGS

FIG. 1 illustrates a perspective top interior view of a sealant containment member, according to an embodiment of the present disclosure.

FIG. 2 illustrates a perspective top exterior view of a sealant containment member, according to an embodiment of the present disclosure.

FIG. 3 illustrates a top view of a sealant containment member, according to an embodiment of the present disclosure.

FIG. 4 illustrates a front view of a sealant containment member, according to an embodiment of the present disclosure.

FIG. 5 illustrates an exterior lateral view of a sealant containment member, according to an embodiment of the present disclosure.

DETAILED DESCRIPTION OF THE DISCLOSURE

Figure 6:
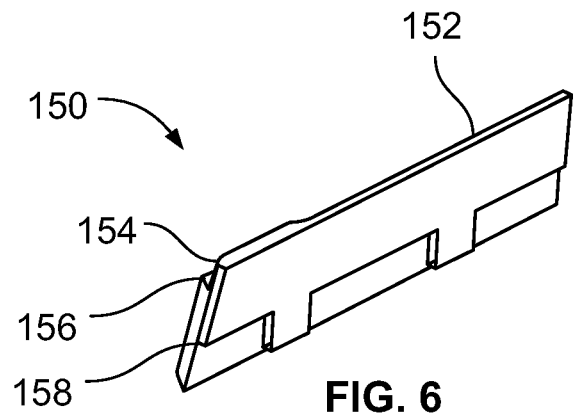
FIG. 6 illustrates a perspective top exterior view of a sealant containment member, according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Embodiments of the present disclosure provide systems and methods that reduce the time and labor of sealing fasteners that are used to secure components of an aircraft together. Certain embodiments of the present disclosure provide a sealant containment assembly that may be formed of a pre-cured sealant. The sealant containment assembly may be fit into place underneath a component (such as a stringer tab), and sealed in place to provide a fluid tight fit. After the sealant containment assembly is secured to the component(s), fluid sealant is injected therein and allowed to cure. The injection of sealant eliminates, minimizes, or otherwise reduces a time-consuming manual fairing step associated with certain safety and manufacturing standards for sealant applications.

Certain embodiments of the present disclosure provide a sealant containment assembly, such as a sealant dam, wall(s), barrier(s), and/or the like. The sealant containment assembly may include at least one sealant wall arranged to bound a fastener pattern having a plurality of fasteners. The sealant wall(s) defines an interior volume in which the fastener pattern is positioned. An interior sealant substantially fills the interior volume. An edge bond is formed between a portion of the sealant wall(s). At least one injection hole and at least one escape hole may be formed in sealant wall(s).

The fastener pattern is an area and/or volume that defines the position of fasteners that are used to connect components together. The fastener pattern may include a plurality of through-holes arranged in particular configuration (including a number of through-holes and particular spacing and orientation between the through-holes) that defines the location of the fasteners that are used to securely connect the components together.

Certain embodiments of the present disclosure provide a method of sealing a plurality of fasteners. The method may include providing one or more sealant walls that define an interior volume in which a fastener pattern is positioned. The method may also include injecting a sealant into the volume via at least one injection hole such that the volume is filled with the sealant and gas within the volume is displaced from the volume via an exhaust port (such as an escape hole), which may be positioned at a higher level than the injection hole.

Embodiments of the present disclosure provide systems and methods that are used to efficiently seal fasteners within a fastener pattern in a confined space. The systems and methods may be used to seal an entire area and/or volume of a fastener pattern by packing the area full of sealant, as opposed to attempting to address each individual fastener with sealant. In short, when a plurality of fastener heads or nuts of a structural assembly terminate in a space that is tight, it can be difficult to access the fasteners to seal them thoroughly due to ergonomic and pragmatic realities presented by the tight space and adjacent blocking fasteners. Embodiments of the present disclosure may be used to effectively and efficiently seal fasteners within a fastener pattern of a wing-to-body joint of an aircraft in which sealant is used to prevent electrical sparking between proximal structural components. The systems and methods described herein may be used with fasteners that may or may not include sealant caps.

Embodiments of the present disclosure provide systems and methods that facilitate (a) efficient sealing and inspection, (b) increased quality and safety, and (c) less manufacturing rework.

FIG. 1 illustrates a perspective top interior view of a sealant containment member 100, according to an embodiment of the present disclosure. The sealant containment member 100 may be integrally molded and formed as a single piece of pre-cured sealant, such as a polysulfide-based sealant. The sealant containment member 100 may be formed as a solid piece of sealant. The same or different type of sealant may be injected in fluid form into (and set and cure within) a sealing chamber defined by a sealant containment assembly that may include the sealant containment member 100, as described below. Alternatively, the sealant containment member 100 may be formed of various other sealants, such as epoxy-based sealants.

The sealant containment member 100 may include a sealant wall 102 connected to a sealant wall 104. The sealant wall 102 includes a free end 106 that connects to a connection end 108 through an intermediate portion 110. The connection end 108 forms a connection joint 112 with a connection end 114 of the sealant wall 104.

An interior surface 116 of the sealant wall 102 may include a variety of formations that are configured to accommodate portions of fasteners, and/or components to which the sealant wall 102 connects. For example, a ledge 118 may be formed on the interior surface 116. The ledge 118 may be configured to be positioned underneath and support a lower surface of a stringer, for example. A rounded interface 120 may be formed in the interior surface 120 at an end of the ledge 118 proximate to the connection end 108. The rounded interface 120 may be configured to accommodate and/or abut into an outer circumferential portion of a fastener (which may or may not include a sealing cap), for example. Additionally, one or more cavities 122 may be formed underneath the ledge 118 and configured to accommodate structural features of a component to which the sealant wall 102 couples. More or less features than shown may be formed in the interior surface 116. The number and size of various features depends on the size and shape of a component to which the sealant wall 102 is to couple.

The sealant wall 104 includes a free end 124 that connects to the connection end 114 through an intermediate portion 126. As noted, the connection end 114 forms the connection joint 112 with the connection end 108 of the sealant wall 102.

An interior surface 128 of the sealant wall 104 may be flat in order to abut against a flat wall of a component. Optionally, the interior surface 128 may include a variety of formations that are configured to accommodate portions of fasteners, and/or components to which the sealant wall 104 connects, depending on the size and shape of the component to which the interior surface 128 is to couple.

FIG. 2 illustrates a perspective top exterior view of the sealant containment member 100. An exterior surface 130 of the sealant wall 102 may be flat. Optionally, one or more features, may be formed within the exterior surface 130 to accommodate a particular component.

A longitudinal channel 132 may be formed through an exterior surface 134 of the sealant wall 104. The longitudinal channel 132 may define a semi-circular axial cross-section, for example. Optionally, the longitudinal channel 132 may be sized and shaped differently than shown. The longitudinal channel 132 may be sized and shaped to be proximate to a portion of a chamber through which fuel flows, and may be configured to allow the fuel to flow therethrough. Alternatively, the exterior surface 134 may not include the longitudinal channel. In at least one other embodiment, the exterior surface 134 may be flat. In at least one other embodiment, various features may be formed in the exterior surface to accommodate a component to which the exterior surface 134 is to couple.

FIG. 3 illustrates a top view of the sealant containment member 100. The sealant wall 102 may connect to the sealant wall 104 at an angle θ, such as a 135° angle. The angle θ is determined by a size and shape of one or more components to which the sealant containment member 100 is to couple. Alternatively, the angle θ may be greater or less than 135°. In at least one embodiment, the angle θ may be 90°.

FIG. 4 illustrates a front view of the sealant containment member 100. As shown, lower edges 136 of the sealant wall 102 may include recessed portions 138 or other such features that are configured to accommodate a size and shape of a particular component. Similarly, an upper edge 140 may include a tapered portion that is configured to accommodate and size and shape of a particular component.

FIG. 5 illustrates an exterior lateral view of a sealant containment member 100. Referring to FIGS. 2 and 5, an exhaust port 142 may be formed through an upper edge 144 of the sealant wall 102. The exhaust port 142 may be at the highest level of the sealant containment member 100 in order to allow escaping, rising gas to pass therethrough as sealant fills a sealing chamber (as described below). The exhaust port 142 provides an opening through which gas (such as air) may pass out when sealant is poured within a sealing chamber between the sealant walls 102 and 104. Additional exhaust ports may be formed through the sealant wall 102 and/or the sealant wall 104. Optionally, the exhaust port 142 may be positioned in the sealant wall 104 instead of the sealant wall 102. Alternatively, the opening 142 may be positioned at a lower level of the sealant containment member 100.

An injection port 146 may be formed through the sealant wall 102. The injection port 146 may be below a level of the exhaust port 142. The injection port 146 provides an opening through which fluid sealant (such as the same type of sealant that forms the sealant containment member 100 is formed) is injected. Optionally, the injection port 146 may be provided at various other portions of the sealant containment member 100 than shown. Also, optionally, the sealant containment member 100 may not include the injection port 146. Instead, an injection port may be formed through a portion of another sealant containment member to which the sealant containment member 100 connects.

Figure 7:
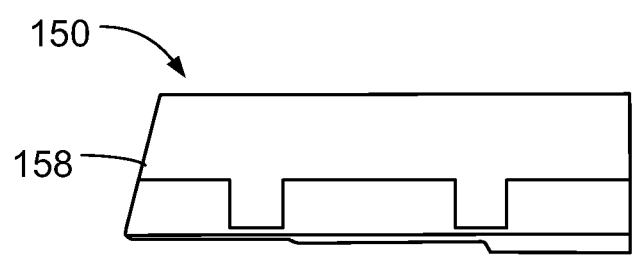
FIG. 7 illustrates an exterior lateral view of a sealant containment member, according to an embodiment of the present disclosure.

FIG. 6 illustrates a perspective top exterior view of a sealant containment member 150, according to an embodiment of the present disclosure. FIG. 7 illustrates an exterior lateral view of the sealant containment member 150. Referring to FIGS. 6 and 7, the sealant containment member 150 may be integrally molded and formed as a single piece of pre-cured sealant, such as a polysulfide-based sealant. The sealant containment member 150 may be formed as a solid piece of sealant. The same or different type of sealant may be injected in fluid form into (and set and cure within) a sealing chamber defined by a sealant containment assembly that may include the sealant containment member 150, as described below. Alternatively, the sealant containment member 150 may be formed of various other sealants, such as epoxy-based sealants.

The sealant containment member 150 may form or otherwise include a sealant wall 152, similar to those described above. The sealant wall 152 is configured to connect to the free end 124 of the sealant wall 104 (shown in FIGS. 1-5). As such, the sealant containment member 150 couples to the sealant containment member 150 to provide a sealant containment assembly having three sealant walls 102, 104, and 152, which define an interior volume that defines a sealing chamber therebetween.

The sealant wall 152 may include various features that are configured to accommodate a component (such as a structural body, fastener, and/or the like) similar to those described above. For example, an interior surface 154 may include a ledge 156. Further, an end 158 of the sealant wall 152 may be angled to conform to the angle of the free end 124 of the sealant wall 104 (shown in FIGS. 1-5). The sealant wall 152 may include more or less features than shown, depending on the size and shape of a component to which the sealant wall 152 couples.

Figure 8:
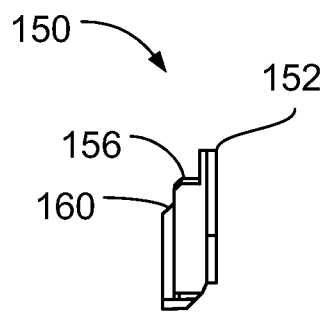
FIG. 8 illustrates a front edge view of a sealant containment member, according to an embodiment of the present disclosure.
Figure 9:
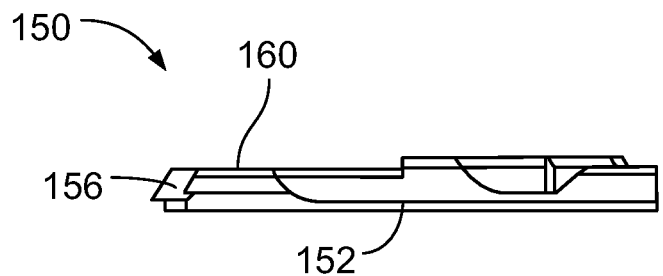
FIG. 9 illustrates a top view of a sealant containment member, according to an embodiment of the present disclosure.

FIG. 8 illustrates a front edge view of the sealant containment member 150. FIG. 9 illustrates a top view of the sealant containment member 150. Referring to FIGS. 8 and 9, the sealant wall 152 may include an interior angled ledge 160 below the ledge 156. Again, the number, shape, and size of the features (such as the ledges 156 and 160) depends on the size and shape of a particular component to which the sealant wall 152 couples.

Figure 10:
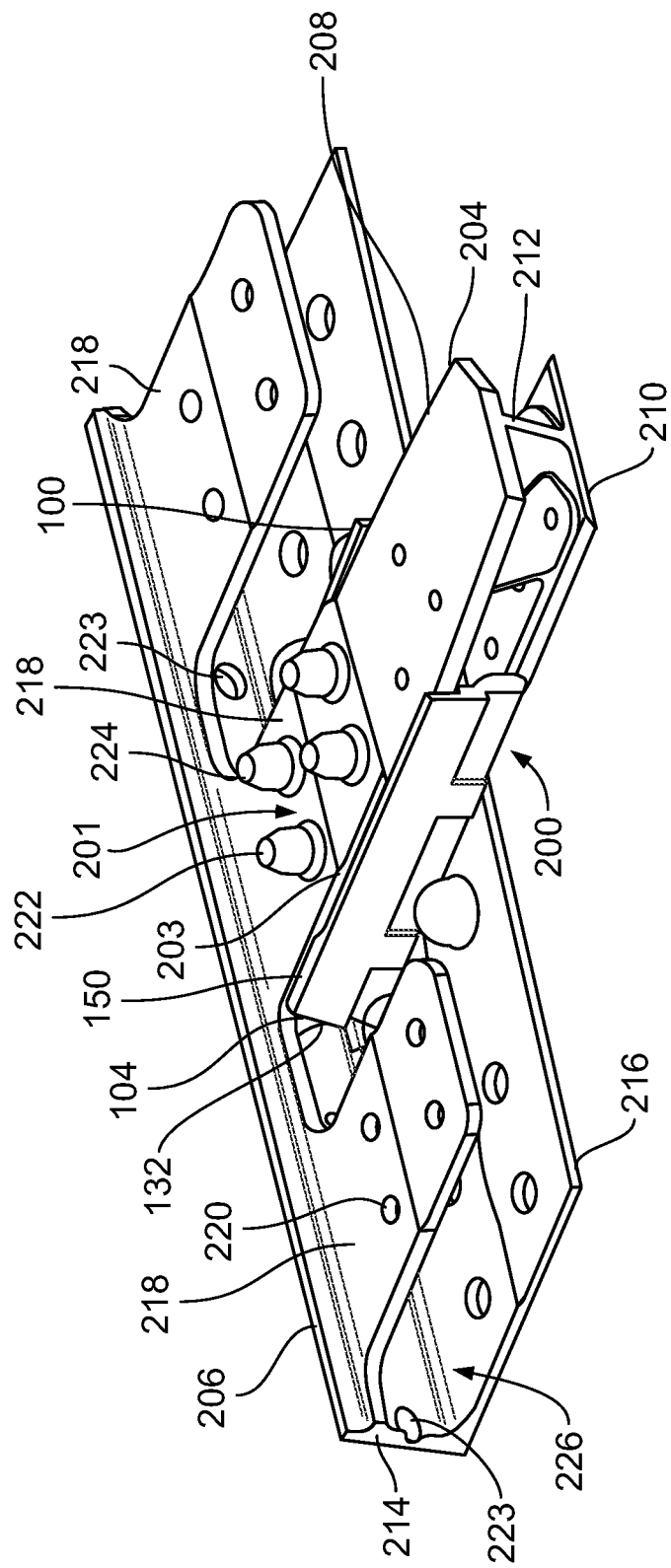
FIG. 10 illustrates a perspective top view of a sealant containment assembly surrounding a fastener pattern that joins a wing component to an interior body, according to an embodiment of the present disclosure.

FIG. 10 illustrates a perspective top view of a sealant containment assembly 200 surrounding a fastener pattern 201 that joins a wing component 204 to an interior body 206, according to an embodiment of the present disclosure. The sealant containment assembly 200 may include the sealant containment member 100 and the sealant containment member 150. For example, the sealant containment member 100 may connect to the sealant containment member 150. The sealant containment assembly 200 defines a sealing chamber 203 between the sealant containment member 100 and the sealant containment member 150.

The wing component 204 may be formed of a composite material, and may include a stringer 208 connected to an outer skin 210 through an orthogonal beam 212. Optionally, the wing component 204 may be formed of a metallic material.

The interior body 206 may be a portion of a fuselage of an aircraft, or may be a joint that connects to the fuselage. For example, the interior body 206 may be a portion of a fuel delivery housing. The interior body 206 may be formed of a metal, such as titanium.

The interior body 206 may include an inboard wall 214 and a lower panel 216 extending outwardly from a lower portion of the inboard wall 214. Connection tabs 218 outwardly extend from an upper portion of the inboard wall 214. The connection tabs 218 may include a plurality of fastener through holes 220 that are configured to receive a shaft of a fastener 222. The fasteners 222 are used to securely connect the stringer 208 to a connection tab 218. Each fastener 222 may include a sealing cap 224. Alternatively, the fasteners 222 may not include the sealing caps 224.

As shown, fuel ports 223 may be formed through the inboard wall 214 and are configured to allow fuel to pass to and/or from an exterior 226 of the inboard wall 214. The channel 132 of the sealing containment member 100 allows fluid to pass therethrough, so as not to restrict a flow of fuel.

Figure 11:
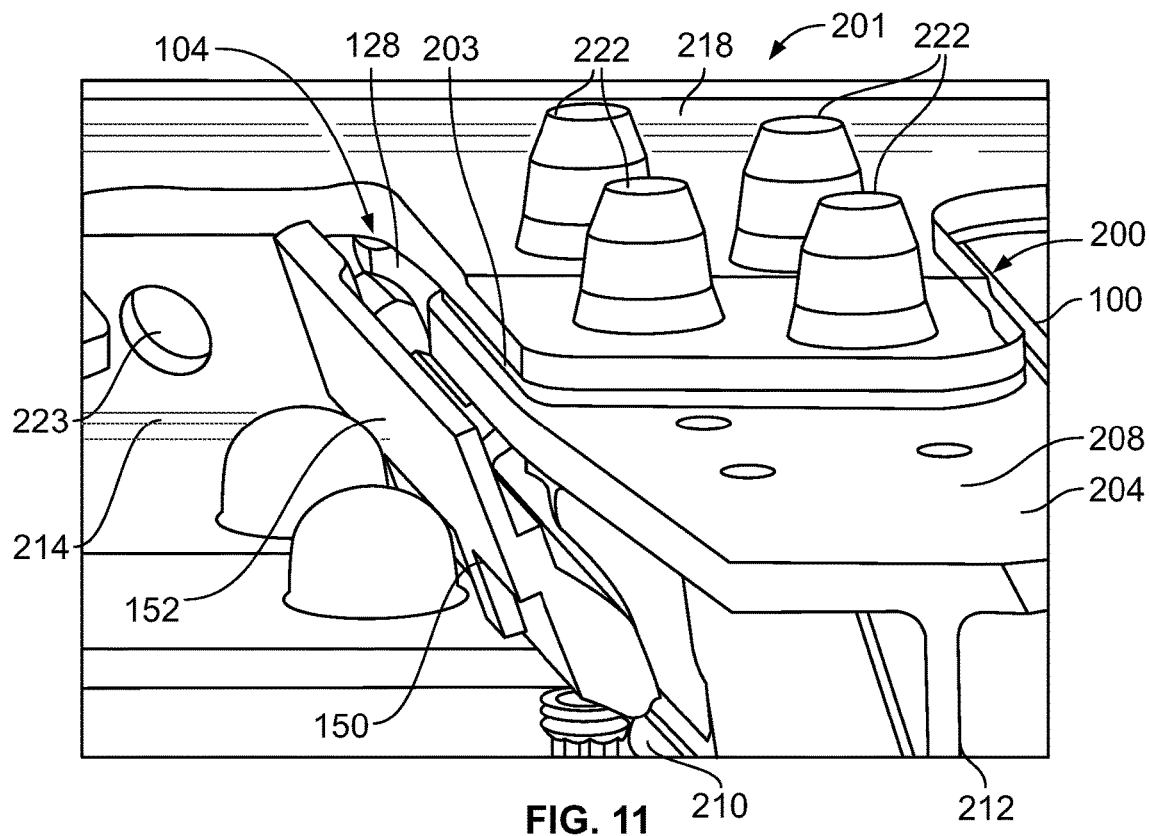
FIG. 11 illustrates a perspective top view of a sealant containment member being secured to a wing component and an interior body, according to an embodiment of the present disclosure.
Figure 12:
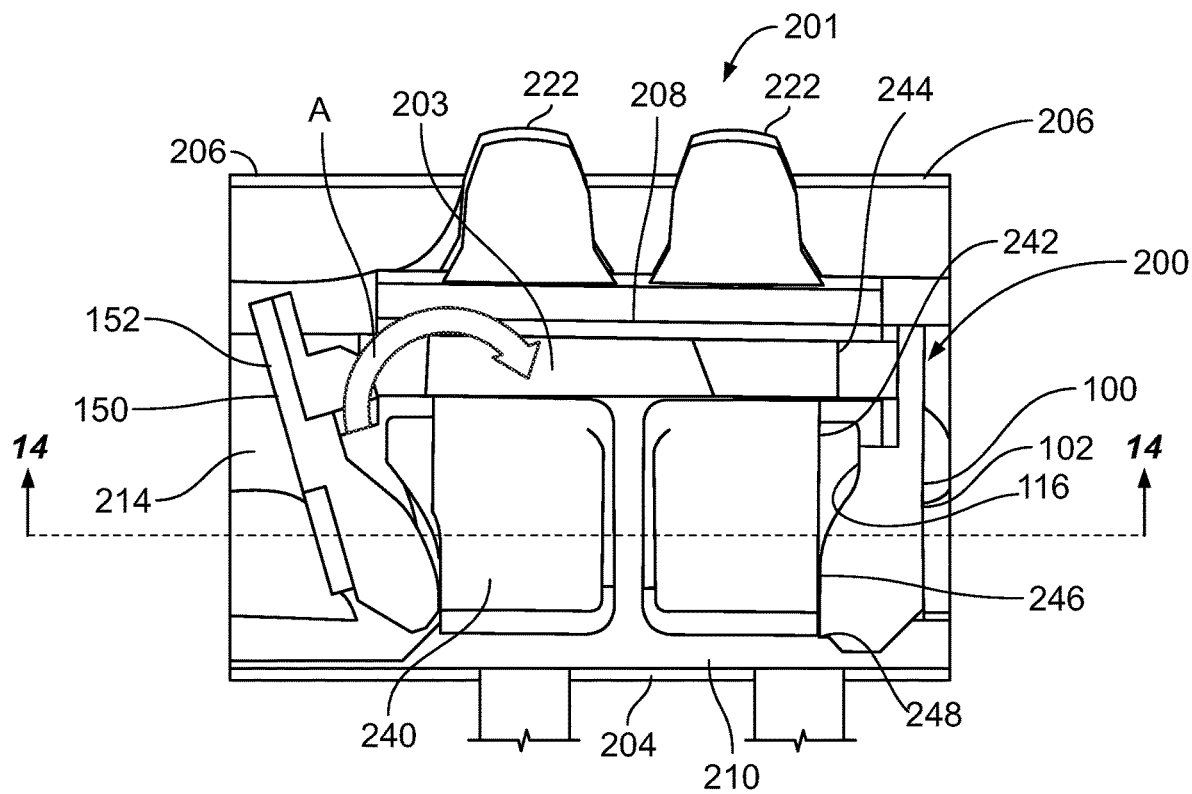
FIG. 12 illustrates a front view of a sealant containment member being secured to a wing component and an interior body, according to an embodiment of the present disclosure.

FIG. 11 illustrates a perspective top view of the sealant containment member 150 being secured to the wing component 204 and the interior body 206, according to an embodiment of the present disclosure. FIG. 12 illustrates a front view of the sealant containment member 150 being secured to the wing component 204 and the interior body 206. Referring to FIGS. 11 and 12, in order to form the sealant containment assembly 200, the sealant containment member 100 is first positioned in relation to the wing component 204 and the interior body 206. The sealant wall 104 (shown in FIGS. 1-5) is slid behind the wing component 204 and a connection joint 240 so that the channel 130 faces the inboard wall 214. The interior surface 116 of the sealant wall 102 is oriented toward a lateral portion 242 of the connection joint 240 and lateral edge portions 244 of the stringer 244. A lower portion 246 of the interior surface 116 may securely abut into the lateral portion 242 and form a barrier therewith and an upper lateral edge portion 248 of the outer skin 210. The interior surface 128 of the sealant wall 104 may abut into interior portions of the connection joint 240 and/or the wing component 204 in a similar fashion. After the sealant containment member 100 is securely positioned, the sealant containment member 150 may be secured to the wing component 204.

As shown, the sealant containment member 150 may be pivoted into position against the wing component 204 and the connection joint 240 opposite from the sealant wall 102. The end 158 (shown in FIGS. 6 and 7) of the sealant wall 152 may abut against the exposed end portion of the interior surface 128 (shown in FIGS. 1-4) of the sealant wall 104 of the sealant containment member 100. After the sealant containment member 150 connects to the sealant containment member 100, the sealing chamber 203 is formed around the fasteners 222 within the fastener pattern 201. The sealant containment assembly 200, which defines the sealing chamber 203, bounds the fastener pattern 201 on at least three sides. Alternatively, the sealant containment assembly 200 may bound more or less than three sides of the fastener pattern 201.

Alternatively, the sealant containment assembly 200 may be formed as a single, unitary piece, instead of two separate and distinct pieces. Also, alternatively, the sealant containment assembly 200 may be formed of more than two pieces.

Figure 13:
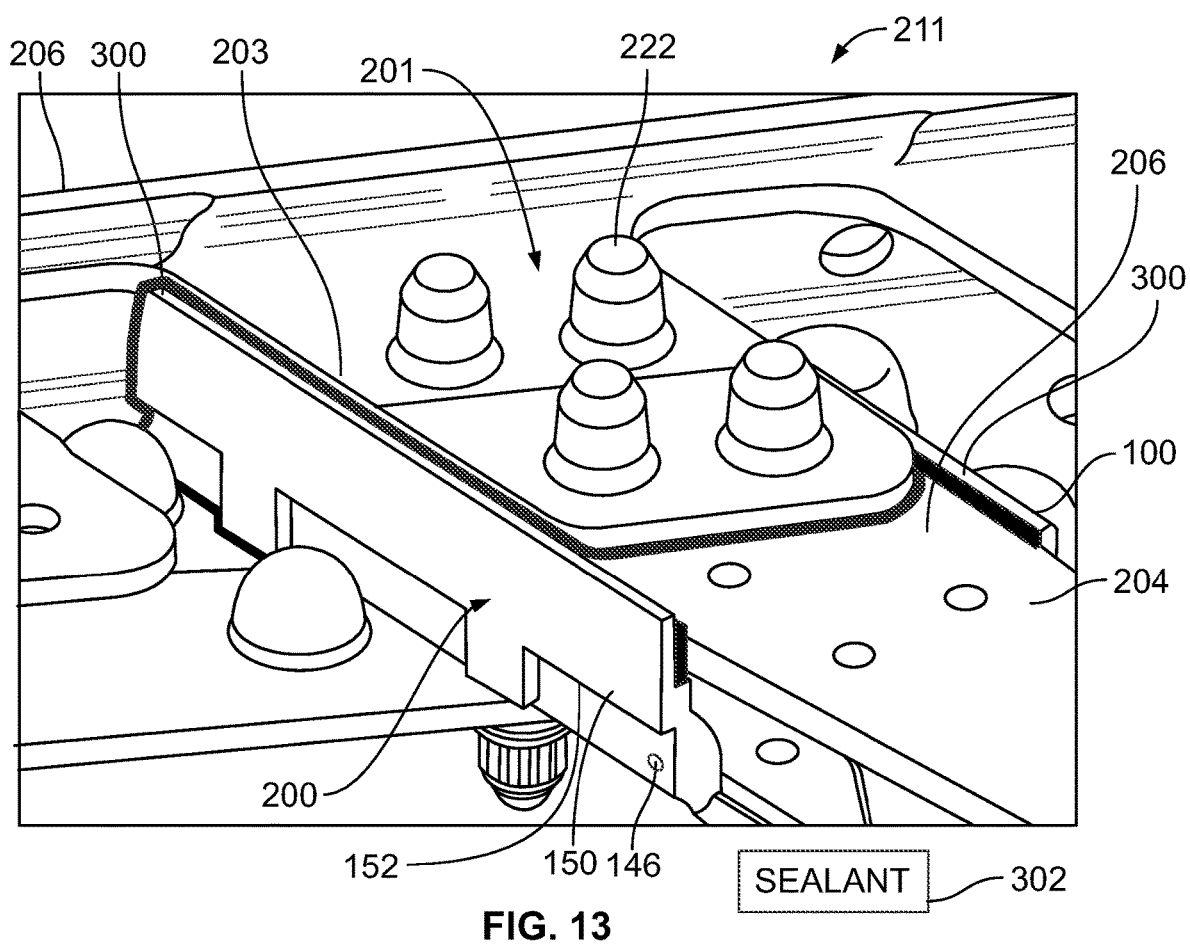
FIG. 13 illustrates a perspective top view a sealant containment assembly secured to a wing component and an interior body, according to an embodiment of the present disclosure.

FIG. 13 illustrates a perspective top view the sealant containment assembly 200 secured to the wing component 204 and the interior body 206, according to an embodiment of the present disclosure. The sealant containment assembly 200 secured to the wing component 204 and the interior body 206 provides a sealing system 211. After the sealant containment assembly 200 is positioned as shown, sealant 300 (such as a fluid version of the sealant that forms the sealant containment assembly 200) is applied to the interfaces between the sealant containment assembly 200 and the wing component 204 and the interior body 206. The sealant 300 may be applied as a bead of sealant at and along the interfaces. After the sealant 300 is applied, the sealant 300 is allowed to cure to form a fluid tight sealant at the interfaces. For example, the sealant 300 may cure in ambient conditions over a period of time, such as one or more hours.

After the sealant 300 cures, additional fluid sealant 302 is injected through the injection port 146, which is shown as being formed through the sealant wall 152, but may be formed through various other portions of the sealant containment assembly 200. As the sealant 302 is injected into the sealing chamber 203 that bounds the fastener pattern 201, the sealant 302 flows around the various fasteners 222 and components therein. The sealant 302 fills the spaces, interstices, and other such voids between the fasteners 222 and the wing component 204 and the interior body 206, thereby sealing the fasteners 222 with respect to those components. As the sealant 302 fills the sealing chamber 203, gas (such as air) with the sealing chamber 203 is exhausted through the exhaust port(s) 142 (shown in FIGS. 2 and 5).

After the sealant 302 is injected into the sealing chamber 203 to a desired level, the sealant 302 is allowed to cure. For example, the sealant 302 may cure in ambient conditions over a period of time, such as one or more hours. After the sealant cures, the sealant 302 provides a fluid tight seal between the fasteners 222, the wing component 204, and the interior body 206. As such, the process of sealing the fasteners 222 is efficient and quick, in that an individual does not need to manually seal and inspect each separate and distinct fastener 222.

As shown and described, the sealant containment assembly 200 includes the two sealant containment members 100 and 150 that define the sealing chamber 203 therebetween. The sealant containment members 100 and 150 sealingly engage peripheral portions of the wing component 204 and the interior body 206, such as through the sealant 300 at the interfaces therebetween. The sealing chamber 203 surrounds the fastener pattern 201. That is, the fastener pattern 201 is subsumed within the sealing chamber 203. The fluid sealant 302 is injected into the sealing chamber 203 and flows around the fasteners 222 (which may include the sealing caps 224) within the fastener pattern 201 that securely connect the wing component 204 and the interior body 206 together. The sealant 302 then cures to form a sealing layer that surrounds the fasteners 222 at areas where they interface with the wing component 204 and the interior body 206.

Figure 14:
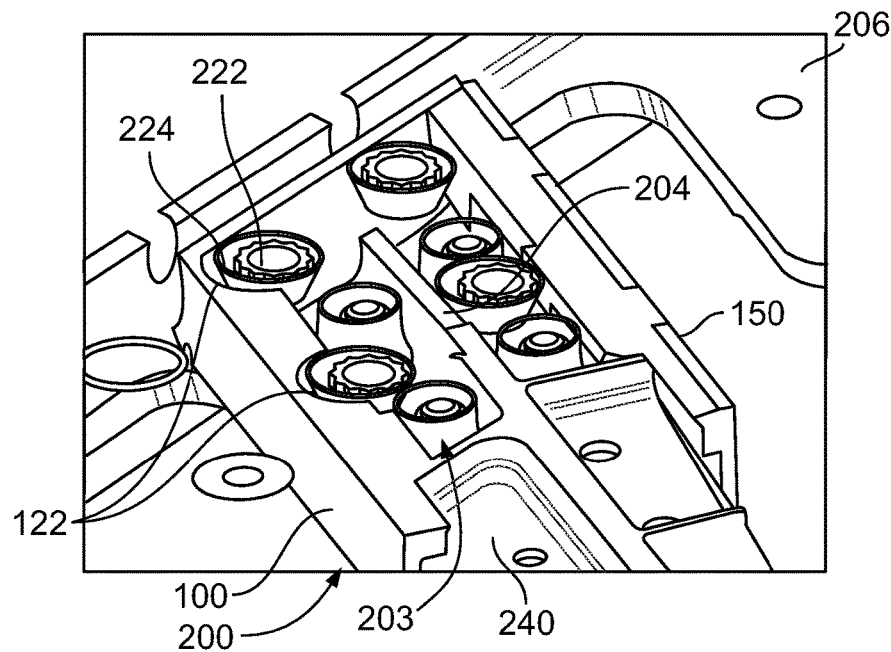
FIG. 14 illustrates a cross-sectional view of a sealing chamber of a sealing containment assembly through line 14-14 of FIG. 12, according to an embodiment of the present disclosure.

FIG. 14 illustrates a cross-sectional view of the sealing chamber 203 (from below) of the sealing containment assembly 200 through line 14-14 of FIG. 12, according to an embodiment of the present disclosure. As shown, the cavities 122 are sized and shaped to conform to an outer shape of sealing caps 224 of the fasteners 222. A small gap may exist between the cavities 122 and the sealing caps 224 in order to allow sealant to flow therebetween, set, and cure. As noted, the various features formed into the portions of the sealing containment assembly 200 are configured to cooperate with various structures of the wing component 204, the interior body 206, and/or the connection joint 240 to allow for a secure fitting therebetween. The features are formed based on the size and shape of the components to which they are to couple.

Alternatively, the sealing containment assembly 200 may be formed as a single piece. In at least one other embodiment, the sealing containment assembly 200 may include three or more pieces. As shown and described, the sealing containment assembly 200 may bound three sides of the fastener pattern 201. In at least one other embodiment, the sealing containment assembly 200 may bound less than three sides of the fastener pattern 201. In at least one other embodiment, the sealing containment assembly 200 may bound more than three sides of the fastener pattern 201. For example, the sealing containment assembly 200 may include four sealant walls that form a sleeve that surrounds four sides of the fastener pattern 201.

Figure 15:
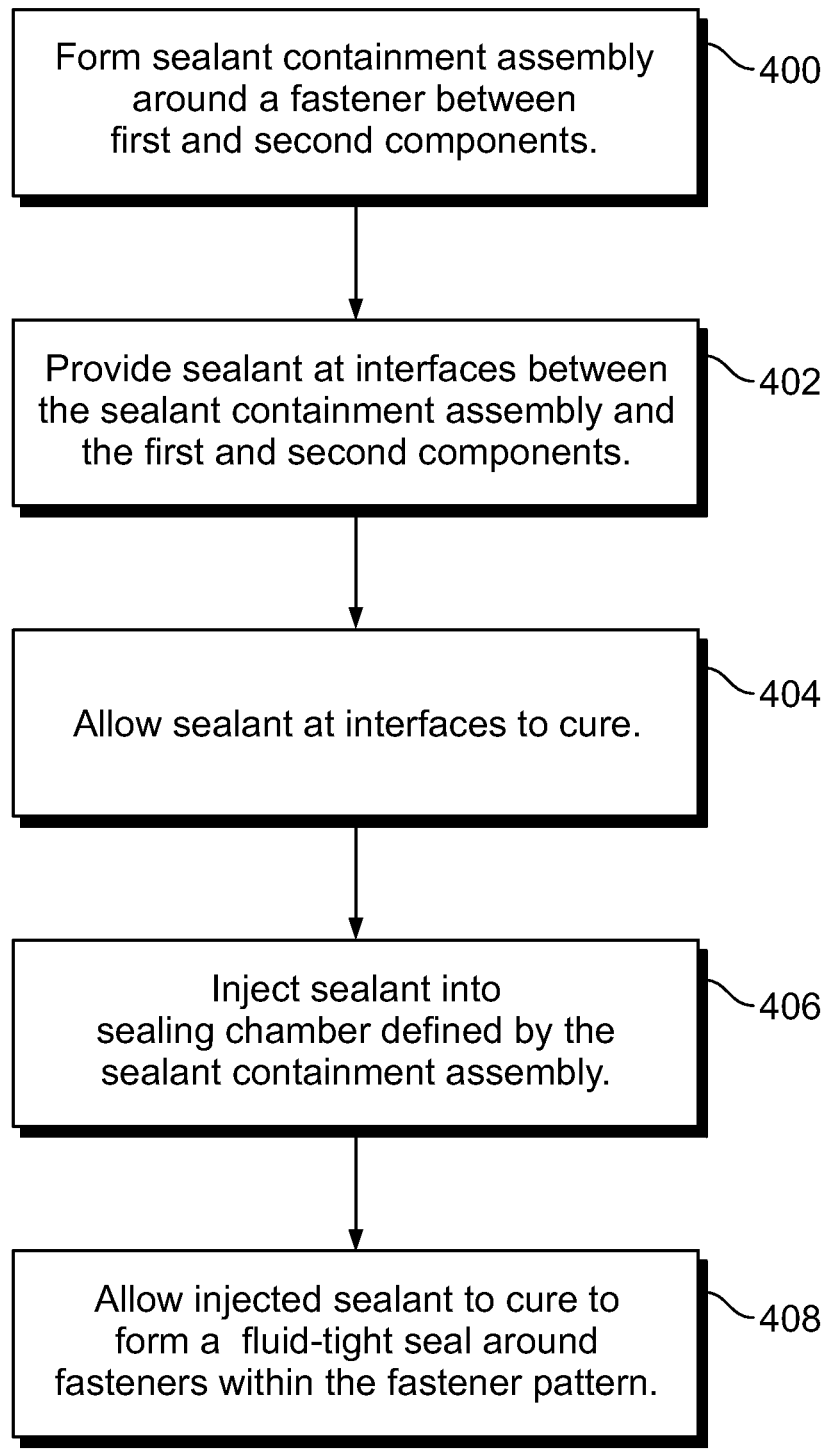
FIG. 15 illustrates a flow chart of a method of sealing fasteners that connect two components together.

FIG. 15 illustrates a flow chart of a method of sealing fasteners that connect two components together. The method begins at 400, in which a sealant containment assembly is formed around at least a portion (such as two or more sides) of a fastener pattern between first and second components, such as a wing component and an interior body of an aircraft. At 402, sealant is provided at interfaces between the sealant containment assembly and the first and second components. At 404, the sealant at the interfaces is allowed to cure. At 406, sealant is injected into a sealing chamber (which surrounds at least a portion of the fastener pattern) defined by the sealant containment assembly. At 408, the injected sealant is allowed to cure to form a fluid-tight seal around fasteners within the fastener pattern.

After the sealant cures to form the fluid-tight seal around the fasteners, the sealant containment assembly may be removed from the components, thereby leaving the cured sealant layer in place. Alternatively, the sealant containment assembly may remain in place.

Referring to FIGS. 1-15, embodiments of the present disclosure provide systems and methods that allow for efficient sealing and inspection of fasteners, increased quality and safety, as well as less manufacturing rework. Embodiments of the present disclosure provide a sealant containment assembly that is configured to provide a dam that may be filled with sealant that flows around fasteners that connect components together.

Figure 16:
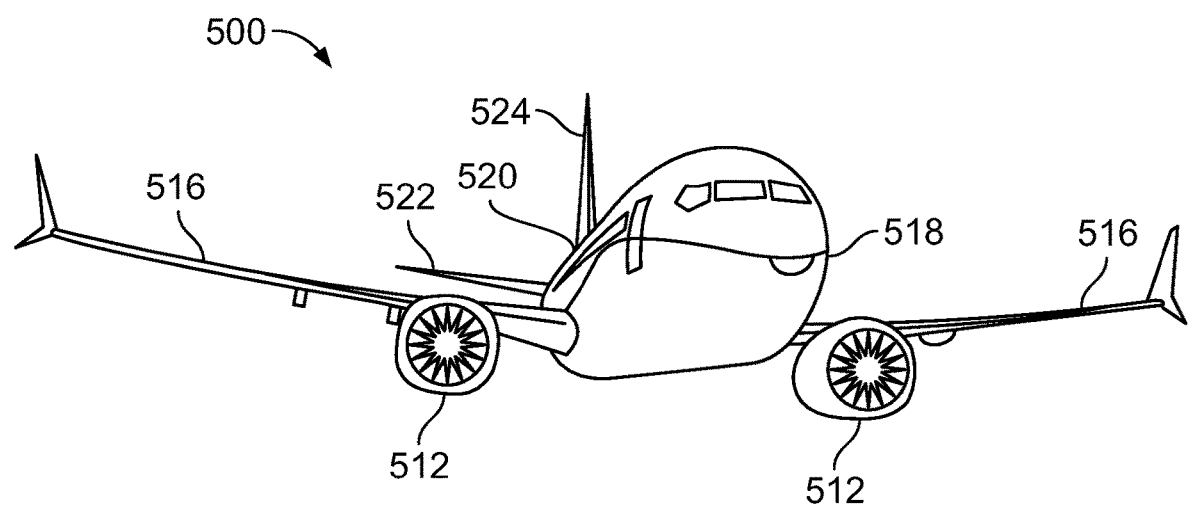
FIG. 16 illustrates a perspective front view of an aircraft.

FIG. 16 illustrates a perspective front view of an aircraft 500. Embodiments of the present disclosure may be used to seal fasteners that are used to secure components of the aircraft together. For example, the sealing containment assembly 200 described above may be used to surround a fastener pattern that joins components together.

The aircraft 500 may include a propulsion system that may include two turbofan engines 512, for example. Optionally, the propulsion system may include more engines 512 than shown. The engines 512 are carried by wings 516 (which may include stringers and outer skin portions) of the aircraft 500. In other embodiments, the engines 512 may be carried by a fuselage 518 and/or an empennage 520. The empennage 520 may also support horizontal stabilizers 522 and a vertical stabilizer 524. The wings 516, the horizontal stabilizers 522, and the vertical stabilizer 524 may each include one or more control surfaces.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A sealing system comprising:
   at least two components secured together through a plurality of fasteners in a fastener pattern; and
   a sealant containment assembly comprising:
      a first sealant containment member that connects to a second sealant containment member, wherein the first sealant containment member and the second sealant containment member are formed of pre-cured sealant, wherein a sealing chamber is around at least a portion of the fastener pattern so as to allow fluid sealant to flow into the sealing chamber and cure to seal and bond to the first sealant containment member, the second sealant containment member, and fasteners within the fastener pattern.

2. The sealing system of claim 1, wherein the first sealant containment member comprises a first sealant wall connected to a second sealant wall, and wherein the second sealant containment member forms a third sealant wall.

3. The sealing system of claim 1, wherein one or both of the first sealant containment member and the second sealant containment member comprises features formed therein that are configured to conform to shapes of one or more of the at least two components and the fasteners.

4. The sealing system of claim 1, wherein one or both of the first sealant containment member and the second sealant containment member comprises at least one injection port formed through a sealant wall through which the fluid sealant is injected into the sealing chamber.

5. The sealing system of claim 1, wherein one or both of the first sealant containment member and the second sealant containment member comprises at least one exhaust port through which gas within the sealing chamber passes out of the sealing chamber.

6. The sealing system of claim 5, wherein the at least one exhaust port is formed through a portion of an upper edge of one or both of the first sealant containment member and the second sealant containment member.

7. The sealing system of claim 1, wherein one or both of the first sealant containment member and the second sealant containment member comprises a longitudinal channel on an exterior surface that is configured to allow liquid to pass therethrough.

8. The sealing system of claim 1, wherein the first sealant containment member and the second sealant containment member are configured to sealingly engage peripheral portions of the at least two components.

9. The sealing system of claim 1, wherein the sealing chamber is defined between the first sealant containment member and the second sealant containment member.

10. The sealing system of claim 1, wherein the at least two components comprise a wing component of an aircraft and an interior body of the aircraft.

11. The sealing system of claim 1, wherein one or both of the first sealant containment member or the second sealant containment member are formed as a single piece of pre-cured polysulfide-based sealant.

12. A sealing system comprising:
    a first component;
    a second component secured to the first component through a plurality of fasteners in a fastener pattern; and
    a sealant containment assembly configured to bound at least a portion of the fastener pattern between the first and second components, the sealant containment assembly comprising:
       a first sealant containment member that connects to a second sealant containment member, wherein the first sealant containment member and the second sealant containment member are formed of pre-cured sealant, wherein the first sealant containment member and the second sealant containment member are configured to sealingly engage peripheral portions of the first component and the second component, wherein a sealing chamber is defined between the first sealant containment member and the second sealant containment member, wherein the sealing chamber is around at least a portion of the fastener pattern so as to allow fluid sealant to flow into the sealing chamber and cure to seal and bond to the first sealant containment member, the second sealant containment member, and fasteners within the fastener pattern that connect the first component and the second component together.

13. The sealing system of claim 12, further comprising cured sealant at interfaces between the sealant containment assembly and the first and second components.

14. The sealing system of claim 12, wherein the first component comprises a wing component of an aircraft, and wherein the second component comprises an interior body of the aircraft.

15. The sealing system of claim 12, wherein the first sealant containment member comprises a first sealant wall connected to a second sealant wall, and wherein the second sealant containment member forms a third sealant wall.

16. The sealing system of claim 12, wherein one or both of the first sealant containment member and the second sealant containment member comprises features formed therein that are configured to conform to shapes of one or more of the first and second components and the fasteners.

17. The sealing system of claim 12, wherein one or both of the first sealant containment member and the second sealant containment member comprises:
    at least one injection port formed through a sealant wall through which the fluid sealant is injected into the sealing chamber; and
    at least one exhaust port through which gas within the sealing chamber passes out of the sealing chamber, wherein the at least one exhaust port is positioned at a higher level of one or both of the first sealant containment member and the second sealant containment member than the at least one injection port.

18. The sealing system of claim 12, wherein one or both of the first sealant containment member and the second sealant containment member comprises a longitudinal channel on an exterior surface that is configured to allow liquid to pass therethrough.

19. A sealing method comprising:
    forming a sealant containment assembly around at least a portion of a plurality of fasteners in fastener pattern between first and second components, wherein the forming operation comprises forming a first sealant containment member and a second sealant containment member of pre-cured sealant, securing the first sealant containment member to the first and second components, securing the second sealant containment member to the first and second components to couple to the first sealant containment member to the second sealant containment member, and defining a sealing chamber around at least a portion of the fastener pattern between the first sealant containment member and the second sealant containment member;

providing sealant at interfaces between the sealant containment assembly and the first and second components;

allowing the sealant at the interfaces to cure; and allowing fluid sealant to flow into the sealing chamber defined by the sealant containment assembly and cure to seal and bond to the first sealant containment member, the second sealant containment member, and fasteners within the fastener pattern.

20. The sealing method of claim 19, wherein the first component is a wing component of an aircraft, and wherein the second component is an interior body of the aircraft.

* * * * *